United States Patent [19]

Moscovici et al.

[11] Patent Number: 5,987,486
[45] Date of Patent: Nov. 16, 1999

[54] APPARATUS AND METHOD FOR DATA PROCESSING

[75] Inventors: Avishay Moscovici, Tel Aviv; Yehuda Rudin, Netanya, both of Israel

[73] Assignee: Motorola, Inc., Schaumburg, Ill.

[21] Appl. No.: 08/944,609

[22] Filed: Oct. 6, 1997

[51] Int. Cl.$^6$ .................................................. G06F 17/14
[52] U.S. Cl. .......................................... 708/400; 708/402
[58] Field of Search .................................... 708/400–402, 708/525

[56] References Cited

U.S. PATENT DOCUMENTS

5,801,975   9/1998   Thayer et al. ...................... 364/725.03

OTHER PUBLICATIONS

"VLSI architecture and implementation of a high speed 2–D DCT core processor" by Jang, Y.–F.; Kao, J.–N.; Huang, P.–C., Signal Processing of HDTV, VI. Proceedings of the International Workshop on HDTV '94. 443–52.

"Image matching by means of intensity and texture matching in the Fourier domain" by Stone, H.S.; Li, C.S., Journal: Proceedings of the SPIE—The International Society for Optical, Engineering Conference Title: Proc. SPIE—Int. Soc. Opt. Eng. (USA), 1996, vol. 2670 p337–49.

"Bit serial architecture for the calculation of the two dimensional DCT" by Sanchez, M.; Bruguera, J.D.; Zapata, E.L., Conference Title: ESSCIRC '95. Twenty–First European Solid–State Circuits Conference. Proceedings p386–9.

"Improved image decompression for reduced transform coding artifactS" BYO'Rourke, T.P.; Stevenson, R.L., Journal: IEEE Transactions on Circuits and Systems for Video Technology vol. 5, Dec. 1995, No. 6 p490–9.

"New inner product algorithm of the two–dimensional DCT" by Feher, B., Journal: Proceedings of the SPIE—The International Society for Optical, Engineering Conference Title: Proc. SPIE—Int. Soc. Opt. Eng. (USA), vol. 2419, 1995 p436–44.

"Adaptive entropy coded DCT coding of magnetic resonance image sequences" by Mohsenian, N.; Nosratinia, A.; Liu, B.; Orchard, M.T., Conference Title: Nuclear Science Symposium and Medical Imaging Conference. 1994 IEEE Conference Record (Cat. No. 94CH35762) Part vol.4 p1542–6 vol. 4.

"VLSI architecture for video signal processing" by Pirsch, P.; Gehrke, W., Conference Title: Fifth International Conference on Image Processing and its Applications (Conf. Publ. No. 410) p6–10, Publisher: IEE, London, UK.

"Address predicitve color quantization image compression for multimedia applications" by Lai–Man Po; Wen–Tao Tan; Chi–Ho Chan, Part vol5, P. V/289–92 vol. 5, Publisher: IEEE, New York, NY, USA, 1994.

"Block address predictive colour quantisation image compression" by Po, L.–M.; Tan, W.–T., Journal: Electronics Letters vol30, No2 p120–1, Publication Date: Jan. 20, 1994.

"A VQ/DCT coding scheme for colour images" by Hua, W., Conference Title: ICC 91. International Conference on Communications p236–40 vol1, 1991 publisher: IEEE, New York, NY, USA.

"A high quality videophone coder using hierarchical motion estimation and structure coding of the prediction error" by Gilge, M., Journal: Proceedings of the SPIE—The International Society for Optical Engineering vol1001, 1988, pt.2 p864–74.

*Primary Examiner*—Tan V. Mai
*Attorney, Agent, or Firm*—Keith E. Witex; Bruce Hayden

[57] ABSTRACT

A data processing system (100) of the present invention analyses input data (10) for statistical similarities in time and determines processing steps depending on the analysis. The system (100) transfers a first data set (12) which changes at every time transition (i–1) to i into a second data set (13) to output sets (22 and 23) by a transfer function H. According to a method of the present invention, the number of calculation instructions h(n) which are performed is established by comparing consecutive old input data (12) and new input data (13). The transfer function H is thereby simplified and the number of executed instructions optimized.

20 Claims, 3 Drawing Sheets

APPARATUS AND METHOD FOR DATA PROCESSING

FIELD OF THE INVENTION

This invention generally relates to digital signal processing and, in particular, to a method and a system for data transformation.

BACKGROUND OF THE INVENTION

Computer processors are well known and widely used for a variety of purposes. One application of computer processors is digital signal processing (DSP). Digital signal processing is concerned with the representation of signals by sequences of numbers or symbols and the processing of these signals. DSP has a wide variety of applications and its importance is evident in such fields as pattern recognition, radio communication, telecommunications, radar, biomedical engineering, and many others. An example for a calculation algorithm used in DSP is the Discrete Cosine Transformation (DCT). The DCT transforms, e.g., image samples in an image area to DCT-coefficients ("spatial coefficients") in a frequency area. For DSP, it is often required to perform a huge number of calculation operations in a short time. Operations (such as e.g., addition a+b, multiplication a*b, power $a^b$, logarithm $\log_b(a)$, cos (a)) require execution time and hardware. Calculations are conveniently performed by hardware specialized in certain operations (e.g., adders, log-units) or by processors performing different operations. Some operations (e.g., log) can require special memory space, such as, for example, look-up tables. Both execution time and hardware are critical for modern DSP applications. Power consumption and hardware requirements, hence costs, are often larger than desired. Hence, there is a need to provide an apparatus and a method for data processing which mitigates these and other disadvantages of the prior art.

DETAILED DESCRIPTION OF A PREFERRED EMBODIMENT

The present invention introduces a data processing system which analyses input data for statistical similarities in time and skips certain processing steps depending on the analysis. The system of the present invention transfers a data set $\{X(i-1,j)\}$ which changes at every time transition (i−1) to i into a data set $\{X(i,j)\}$, to output sets $\{Y(k-1,l)\}$ and $\{Y(k,l)\}$ by a transfer function H. According to a method of the present invention, the number and the order of calculation instructions which are performed is established by comparing consecutive input data from time i and time (i+1). The transfer function H is thereby simplified. Apparatus and method of the present invention allow one to perform DSP operations in less time. The calculation accuracy can be controlled and optimized in respect to calculation speed. It is possible to achieve substantially equal accuracy when processing steps are skipped or not skipped.

In the following FIG. 1, the present invention is illustrated by discussing data structures. FIGS. 2 and 4 give details for a preferred hardware implementation by way of example, and FIG. 3 explains a method.

Figure 1:
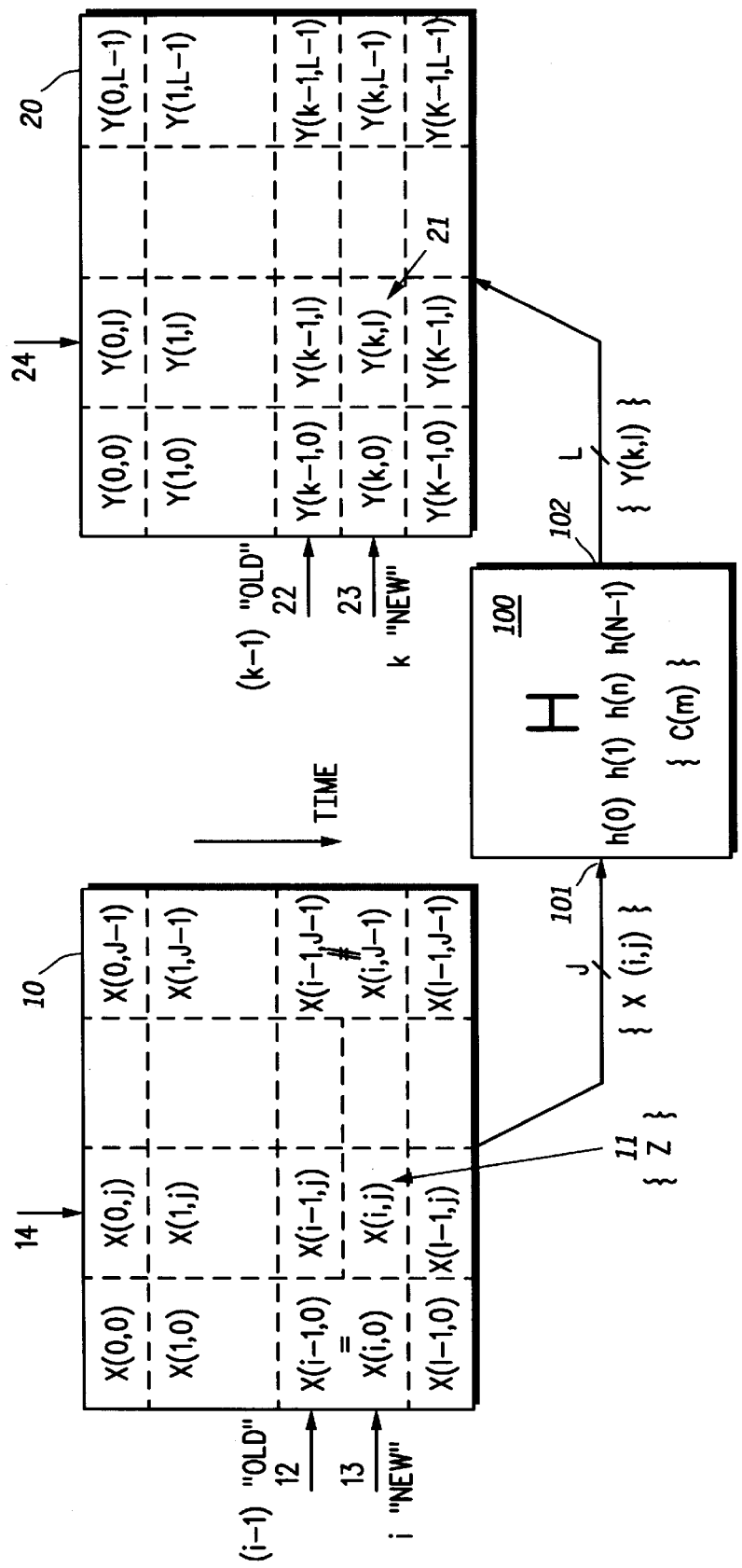
FIG. 1 illustrates a simplified diagram of a system of the present invention with a first data set and a second data set.
Figure 2:
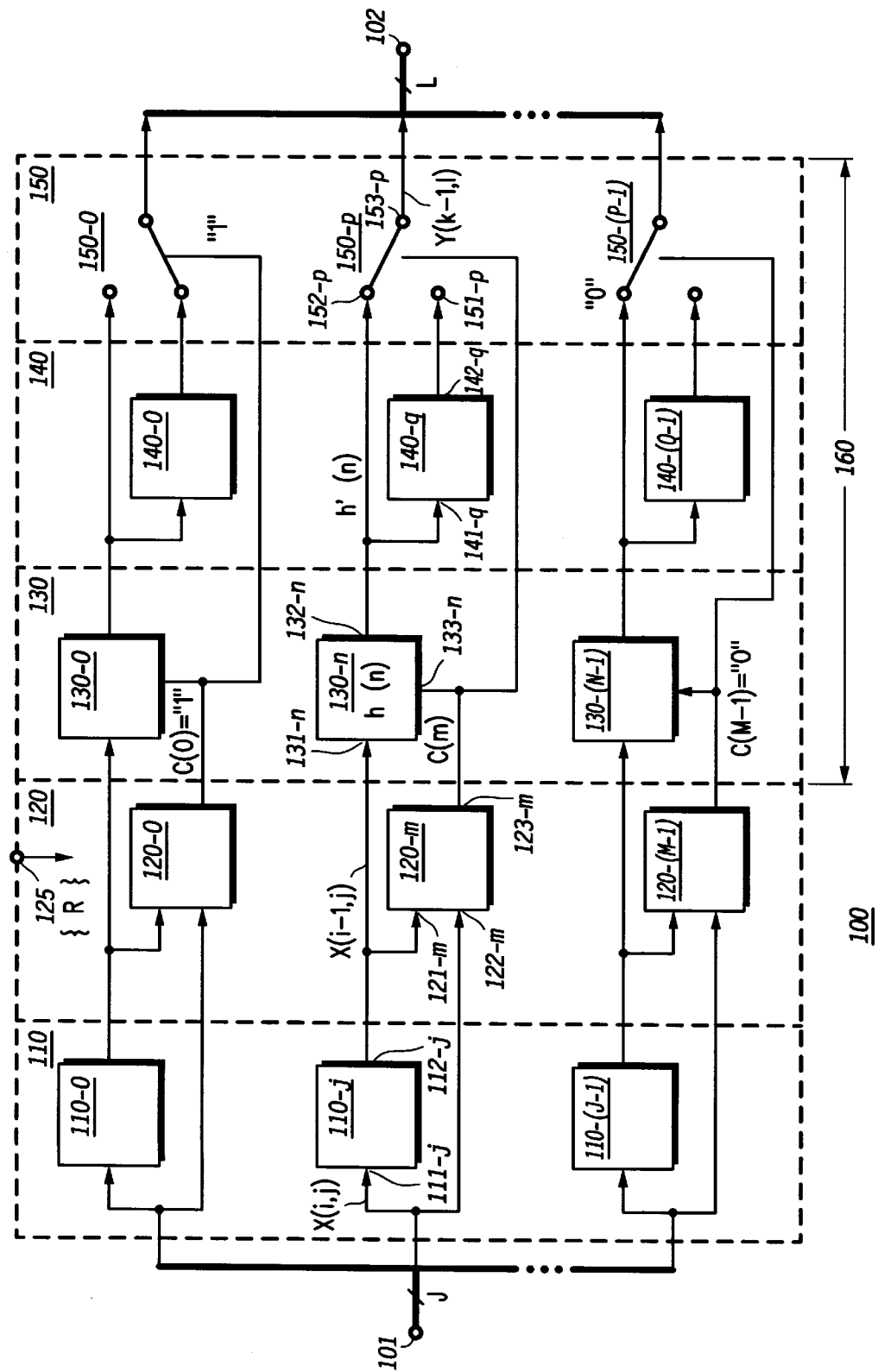
FIG. 2 illustrates a simplified block diagram showing further details of the system of FIG. 1 according to a preferred embodiment of the invention.

FIG. 1 illustrates a simplified diagram of system 100 of the present invention with data set 10 and data set 20. System 100 receives data set 10 at input 101 and provides data set 20 at output 102. Data set 10 has data units 11 (hereinafter X(i,j)) and data set 20 has data units 21 (hereinafter Y(k,l)). For example, but not intended to be limiting, data units X(i,j) can be image samples and Y(k,l) can be DCT-coefficients.

It is convenient to arrange data units X(i,j) and Y(k,l) in two-dimensional matrices. A first dimension, preferably illustrating the "time", is given in rows, such as rows 12 and 13 (time point indices (i−1), i) in data set 10 and rows 22 and 23 (indices (k−1), k) in data set 20. A second dimension, for example, the location of image samples on a screen, is given in columns, such as column 14 in data set 10 and column 24 in data set 20.

The number of X(i,j) and Y(k,l) data units is limited only for purposes of explanation. Data set 10 with X(i,j) has i=0 to I−1 rows (e.g., i for time points) and j=0 to J−1 columns. Data set 20 with Y(k,l) has k=0 to K−1 (e.g., k for time points) rows and l=0 to L−1 columns. The number of data units X(i,j) and Y(k,l) in the columns can be as low as J=1 and L=1, respectively.

The time should proceed with incrementing indices i and k. For further explanation it is convenient to distinguish between "old" and "new" data units. The term "old" is applied to lower time points (i−1) and (k−1) and the term "new" is applied to higher time points i and k.

Every row in data set 10 illustrates input vector $$\{X(i,j)\}_i = \{X(i,0) X(i,1) X(i,j) \ldots X(i,J-1)\} \quad (1)$$

and every row in data set 20 illustrates output vector $$\{Y(k,l)\}_k = \{Y(k,0) Y(k,1) Y(k,l) \ldots Y(k,L-1)\} \quad (2)$$

In other words, data units X(i,j) and Y(k,l) are elements (∈) of input vector $\{X(i,j)\}_i$ and output vector $\{Y(k,l)\}_k$, respectively. Preferably, system 100 receives and provides data in parallel, but system 100 can receive or provide input or output data also serially. If, for example, X(i,j) are image samples, then data set 10 can be considered as a picture which is scanned by rows in a top to down direction (from i=0 to i=I−1), but this is not essential. X(i−1,j) can be image samples taken in one dimension from one picture line (e.g., row 12 with vector $\{X(i,j)\}_i$) and X(i,j) can be are image samples taken in the same dimension from a neighboring picture line (e.g., row 13 with vector $\{X(i,j)\}_i$).

System 100 has transfer function H and transfers an old vector $\{X(i-1,j)\}_{i-1}$ (at time i−1) to an old vector $\{Y(k-1,l)\}_{k-1}$ (at time k−1) and transfers a new vector $\{X(i,j)\}_i$ (at time i) to a new vector $\{Y(k,l)\}_k$ (at time k):

$$\{Y(k,l)\}_k = H(\{X(i,j)\}) \quad (3)$$

It is convenient, when transfer function H does not change with the time, so that $H_{i-1} = H_i$. But this is not essential for the present invention. The time difference between time points i (in data set 10) and time points k (in data set 20) expresses how long system 100 needs to perform a transfer.

Transfer function H comprises any number N of calculation functions h(n) each leading to one or more intermediate results h'(n):

$$H=\{h(0)h(1)h(n)\ldots h(N-1)\} \quad (4)$$

Each h(n) is considered to be a processing step, as for example a+b, a*b, $a^b$, $\log_b(a)$ or combinations thereof. The number N of steps to be performed should be minimized. Calculation functions h(n) also can have sub-functions, such as for example, $h(n)=\Pi a_\mu * b_\mu$ or $h(n)=\Sigma a_\mu * b_\mu$. For simplicity, such sub-functions are not considered here. A person of skill in the art is able, based on the description herein, to apply the present invention to H, to h(n) or to sub-functions. Calculation function h(n) can have any X(i,j) of input vector $\{X(i,j)\}_i$ as arguments and can have one or more intermediate variables h'(n) as result. As used herein, an intermediate variable h'(n) can also be a data unit Y(k,l) of output vector $\{Y(k,l)\}_k$.

For example, H can be a one-dimensional Discrete Cosine Transformation (1D-DCT) with conveniently J=8 image samples (data units X(i,j)) to be transferred to L=8 DCT-coefficients. Thereby, calculation functions h(n) are, for example, h'(n)=X(i,j)* cos (j,n). If, for example, old X(i−1,j) and new X(i,j) would have the same or similar magnitude, than there is no need to perform the multiplication (* cos (j,n)) again.

According to the present invention, system 100 relates old input vector $\{X(i-1,j)\}_{i-1}$ (time i−1) with new input vector $\{X(i,j)\}_i$ (time i) and provides a control vector $\{C(m)\}$ of control words C(m):

$$\{C(m)\}=\{C(0)C(1)C(m)\ldots C(M-1)\}. \quad (5)$$

Preferably: (a) the magnitude M of the control vector $\{C(m)\}$ is equal to the magnitude J of the input vector $\{X(i,j)\}$, so that j=m and J=M; (b) old data unit X(i−1,j) is compared to new data unit X(i,j) of the same column (equal j); and (c) control word C(m) can be a binary number having logical "1" as a first logical value and logical "0" as a second logical value.

But these assumptions (a), (b), and (c) are only for convenience of explanation and for illustrating a preferred embodiment of the present invention. The assumptions are not essential. In general, control vector $\{C(m)\}$ gives information about the differences between old an new input vectors needed to decide which processing steps can be simplified or left out. Or, in other words, system 100 determines which calculation functions h(n) are needed and which of h(n) can be left out.

In the following, it is explained, how control words C(m) are, preferably, derived. The magnitudes of input data units X(i,j) can be numeral representations in an integer format, floating point format, with or without a ±sign, or in any other representation known in the art. Every possible magnitude of X(i,j) can be illustrated as an element of a magnitude set $\{Z\}$ with W elements.

$$\{Z\}=\{Z_0 Z_1 Z_2 Z_3 Z_W \ldots Z_{W-1}\} \quad (6)$$

For integer X(i,j), the magnitude $Z_w$ is represented by S bits:

$$b_{S-1} b_s \ldots b_1 b_0 \quad (7)$$

with bit $b_{S-1}$ for $2^{S-1}$, bit $b_s$ for $2^s$, bit $b_1$ for $2^1=2$, and bit $b_0$ for $2^0=1$. For example, X(i,j) can be represented by 3-bit integers (S=3). In such as case the magnitude set $\{Z\}$ has $W=2^3=8$ elements:

$$\{Z\}=\{000\ 001\ 010\ 011\ 100\ 101\ 110\ 111\ \} \quad (8)$$

The least significant bits (LSB, e.g., $b_0$) are on the right side of $Z_w$ and the most significant bits (MSB, e.g., $b_2$, $b_1$) are on the left side of $Z_w$.

A region $\{R\}$ is a sub-set of $\{Z\}$:

$$\{R\} \subseteq \{Z\} \quad (9)$$

having, conveniently but not necessarily, less than W elements. The $\subseteq$ symbol illustrates that all elements of $\{R\}$ can be also elements of $\{Z\}$. $\{R\}$ has, preferably, at least one element $Z_w$.

When a region or subset $\{R\}$ is defined, the magnitude of an old data unit X(i−1,j) and the magnitude of a new data unit X(i,j) are either in $\{R\}$ or not in $\{R\}$. Control word C(m) is, conveniently, defined as follows:

$$C(m)=\text{``1''} \text{ for } [X(i-1,j)\epsilon\{R\}] \text{ and } [X(i,j)\epsilon\{R\}] \quad (10)$$

$$C(m)=\text{``0''} \text{ otherwise,}$$

wherein $\epsilon$ stands for "being an element of", and stands for logical conjunctive operation, and [] include conditions. In other words, C(m) becomes "1" when old X(i−1,j) and new X(i,j) match. Multiple subsets $\{R\}$ can also be defined.

In a first example (A), subsets $\{R\}$ are defined as:

$$\{R_1\}=\{000\ 001\}, \{R_2\}=\{010\ 011\}, \{R_3\}=\{100\ 101\} \text{ and} \quad (11)$$

$$\{R_4\}=\{110\ 111\}$$

C(m) becomes "1" when the least significant bit (LSB) can have any value. For example ($A_1$), old X(i−1,j)=010 and new X(i,j)=011 are in $\{R_2\}$ and C(m) becomes "1". Or, example ($A_2$), old X(i−1,j)=011 and new X(i,j)=100 and C(m) becomes "0". Example (A) is called "logical comparison". C(m) can be obtained by testing whether some of the S bits are equal or not equal. In example (A), bits $b_2$ and $b_1$ (MSB) are equal in X(i−1,j) and X(i,j). An example for a hardware implementation is given in connection with FIG. 4. However, in both cases ($A_1$) and ($A_2$), the absolute difference of the magnitudes has the value of 1 (|011−010|=1 and |100−011|=1). In a different approach, second example (B) defines subsets as:

$$(R_1)=\{000\ 001\}, \{R_2\}=\{001\ 010\}, \{R_3\}=\{010\ 011\}, \quad (12)$$

$$\{R_4\}=\{011\ 100\} \text{ and so on until } \{R_7\}=\{110\ 111\}.$$

In example (B), C(m) becomes logical "1" when absolute differences between X(i−1, j) and X(i,j) are 1 or C(m) becomes "1" when X(i−1, j) and X(i,j) are equal.

A third example (C), defines subsets as:

$$\{R_1\}=\{000\ 001\ 010\}, R_2=\{001\ 010\ 011\}, R_3=\{010\ 011\ 100\}, \quad (13)$$

$$\{R_4\}=\{011\ 100\ 101\}, \text{ and } \{R_5\}=\{100\ 101\ 110\}$$

Examples (B) and (C) are referred to as "arithmetical comparison". In a fourth example (D), C(m) becomes logical "1" when both X(i−1,j) and X(i,j) are even. A subset is defined as:

$$\{R\}=\{000\ 010\ 100\ 110\} \quad (14).$$

In a fifth example (E), subsets $\{R_0\}$ to $\{R_{W-1}\}$ are equal to the elements $Z_w$ of $\{Z\}$:

$$\{R_w\}=Z_w \quad (15)$$

thus C(m) becomes logical "1" for X(i−1, j)=X(i,j) and becomes logical "0" for X(i−1, j)≠X(i,j).

A person of skill in the art is able to express the general definition (10) for C(m) in other ways, depending on how calculation functions h(n) can be simplified or left out. For example, and not indented to be limiting, C(m) can also be defined as:

$$C(m)=\text{``1''} \text{ for } |X(i,j)-X(i-1,j)| \leq RD(m) \quad (16)$$

$$C(m)=\text{``0''} \text{ for } |X(i,j)-X(i-1,j)| > RD(m) \quad (17)$$

wherein RD is a reference difference. For example (B), reference difference RD equals RD=1; for example (C), reference difference RD equals RD=2; and for example (E), reference difference RD equals RD=0.

The accuracy by which system 100 performs transformation H with alternative calculation functions h(n) depends on the definition of subsets {R}. Subsets {$R_w$} of example (E) (equation 16) with RD=0 gives an exact transformation H.

It is convenient to define control words C(m) for every m in the same way. But, this is not essential for the invention. It is also in the scope of the invention to define C(m) e.g., for every column 14 in a different way. This feature is an advantage of the present invention, when data units X(i,j) in every row of data set 10 have a different influence on the output result.

FIG. 2 illustrates a simplified block diagram showing further details of system 100 of FIG. 1 according to a preferred embodiment of the invention. System 100 comprises J buffer units 110-j, M relator units 120-m, N calculation units 130-n, Q storage units 140-q, and P switches 150-p. The numbers J, M, N, Q and P of the components of system 100 are given only as an example. Indices j, m, n, q and p are conveniently counted from 0 to J−1, M−1, N−1, Q−1, and P−1 respectively. For the purpose of explanation and not intended to be limiting, it is assumed that J=M=N=Q=P and j=m=n=q=p.

Illustrated by dashed frames, buffer units 110-0 to 110-(J−1) form buffer 110, relator units 120-0 to 120-(M−1) form relator 120, calculation units 130-0 to 130-(N−1) form calculator 130, storage units 140-0 to 140-(Q−1) form storage 140, and switches 150-p form control network 150. Calculator 130, storage 140, and control network 150 form processor 160. Although system 100 is illustrated by dedicated hardware, system 100 can also be implemented by a general purpose processor which exchanges data with a memory (e.g., a RAM) and which is controlled by instructions.

Input 101 (see FIGS. 1–2) is coupled to inputs 111-j of buffer units 110-j, so that, preferably, at time point i, new data unit X(i,j) can be stored in buffer units 110-j. Outputs 112-j of buffer units 110-j are coupled to inputs 131-n of calculation units 130-n for providing old data units X(i−1,j). Outputs 132-n of calculation units 130-n are coupled to output 102 via switches 150. Calculation units 130-n each provide one calculation function h(n) yielding intermediate result h'(n). System 100 can transfer data as in equation (3) with input 101, buffer 110, calculation units 130, and output 102 alone. Calculation units 130-n can also be coupled between each other. For simplicity of explanation, these interconnections are not shown in FIG. 2. Such an arrangement is useful when H involves cross products and/or sums among elements of the same input vector at single or successive time intervals. According to the present invention, relator units 120-m have inputs 122-m and 121-m coupled to input 111-j and output 112-j of buffer unit 110, respectively. Relator units 120-m provide control words C(m) at outputs 123-m according to definition (10).

Preferably, relator units 120-m permanently store their subsets {R}. Optionally, relator units 120-m receive subsets {R} from outside of system 100. This feature is illustrated by input 125 to relator 120. The connections of input 125 to all relator units 120-m is not shown for simplicity.

Output 123-m of relator unit 120-m controls switch 150-p. Switch 150-p has, preferably, main terminal 153-p coupled to output 102, auxiliary terminal 152-p coupled to output 132-n of calculation unit 130-n, and auxiliary terminal 151-p coupled to output 142-q of storage unit 140-q. Storage unit 140-q has input 141-q coupled to output 132-n of calculation unit 130-n to store intermediate result h'(n) and provides h'(n) at output 142-q. Output 123-m of relator 120-m is coupled to switch 150-p. For control word C(m)= "1", terminal 151-p and terminal 153-p of switch 150-p are connected so that h'(n) stored in storage unit 140-q is sent to output 102. This state is called e.g., "position 1". Otherwise, for control word C(m)="0" terminal 152-p and terminal 153-p of switch 150-p are connected (e.g., "position 0") and h(n) coming from calculation unit 130-n is sent to output 102. Output 123-m of relator 120-m is coupled to enable input 133-n of calculation unit 130-n. Preferably, calculation unit 130-n is enabled for C(m)="1" and disabled for C(m)= "0" to save power.

For convenience of explaining the function of system 100, it is assumed that X(i−1,j) and X(i,j) are related as in example (E) (equation 15) and that X(i−1,0)=X(i,0) and X(i−1,J−1)≠X(i,J−1). FIG. 1 illustrates this assumption by an = symbol and an ≠ symbol located between rows 12 and 13. Between old time points (i−1) and (k−1), system 100 has transferred old input vector {X(i−1,j)} (input 101) to old output vector {Y(k−1,l)} according to transfer function H using all functions h(n). Intermediate results h'(n) are stored in storage units 140-q. At new time point i, new input vector {X(i,j)} arrives at input 101 and inputs 111-m of buffer 110. Relator 120 provides control words C(m), which are, for example, C(0)="1" and C(M−1)="0". Switch 150-0 goes to position "1" as illustrated and switch 150-P goes to position "0" as illustrated. Computation units 130-0 is disabled and computation unit 130-(N−1) is enabled. Storage units 140-q still store old h(n). Buffer 110 releases new vector {X(i,j)} to computation units 130-n. New output vector {Y(k,l)} is provided with Y(k,0) as the old h'(0) and Y(k,L−1) as the new h'(N−1). Calculation unit 130-0 was not performing a calculation.

System 100 as shown in FIG. 2 is intended to be an example. A person of skill in the art is able, based on the description herein, to modify system 100. For example, calculation functions h(n) of H can be modified or arranged to be executed in a predetermined order which is favorable for e.g., speeding up total calculation time.

Figure 3:
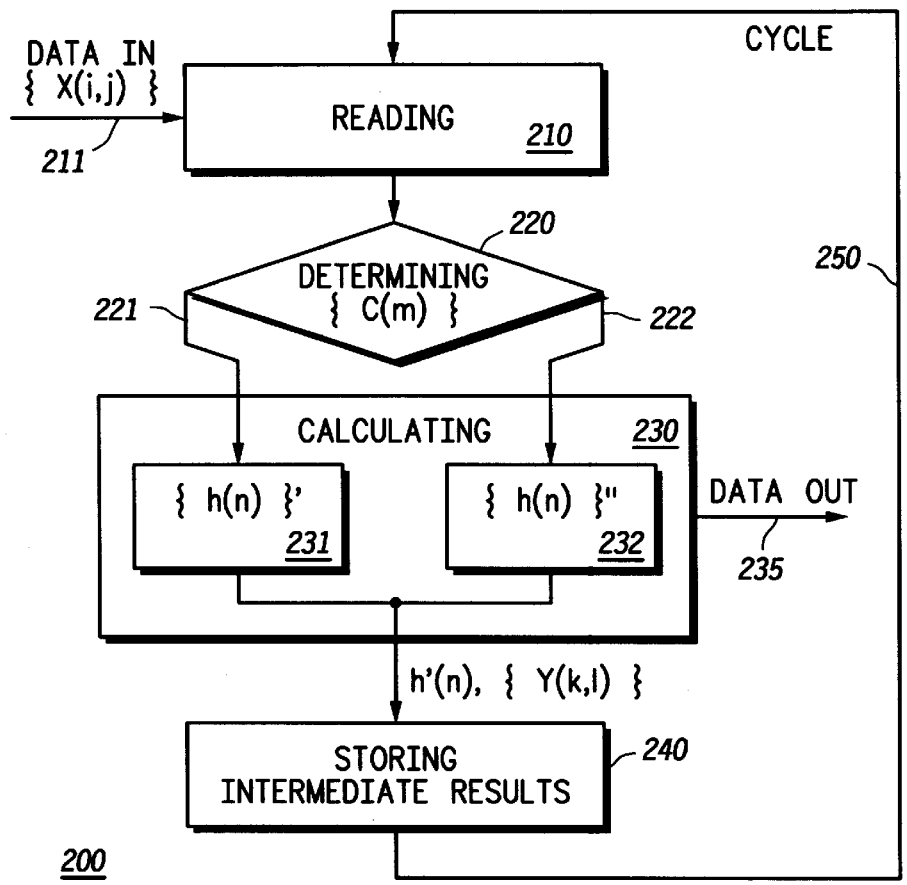
FIG. 3 illustrates a simplified flow chart diagram of a method according to the present invention.
Figure 4:
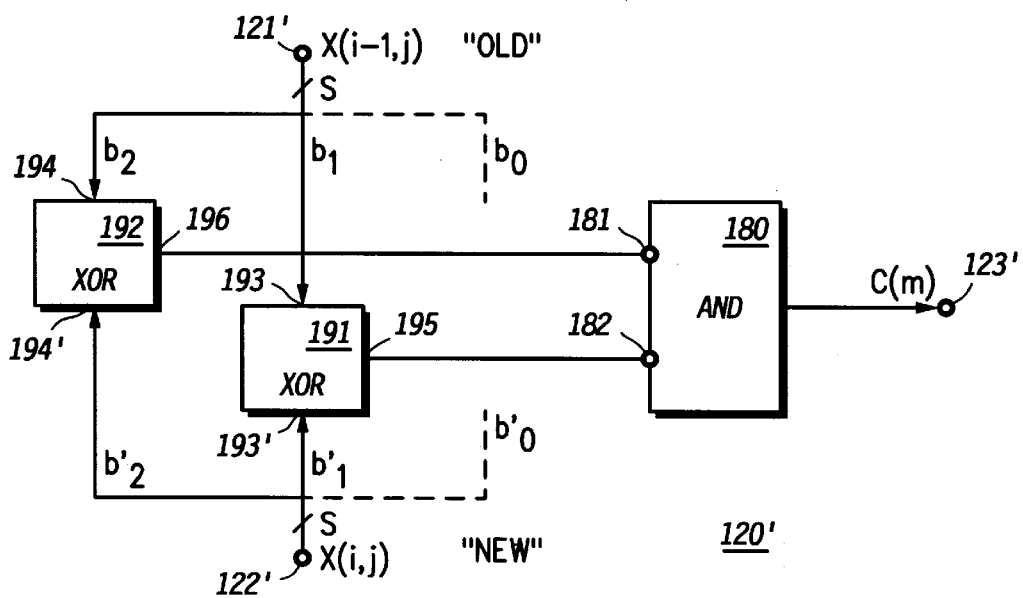
FIG. 4 illustrates a simplified block diagram of an example for a relator unit used in the system of FIG. 2.

FIG. 3 illustrates a simplified flow chart diagram of method 200 according to the present invention. According to method 200, data vectors of a first data set (e.g., data set 10) are transformed to data vectors of a second set (e.g., data set 20) by a transfer function H having calculation functions h(0), h(1), h(n) to h(N−1). Method 200 comprises reading step 210, determining step 220, calculating step 230, and storing intermediate results step 240. Steps 210, 230 and 240 are illustrated by blocks, wherein determining step 220 is illustrated as a query step. Steps 210, 220, 230, and 240 are, preferably, performed consecutively and repeated cyclically as illustrated by line 250. Calculating step 230 which, preferably follows determining step 220, is divided in two alternative steps calculating steps 231 and 232. This is a simplification for the purpose of explanation. The number of alternative calculating steps (such as 231 and 232) depends on the possible number of different control vectors {C(m)} which is conveniently much higher than 2. Lines, such as line 250, between the steps have arrows which illustrate a preferred method flow. Method 200 of the present invention is applied, for example, but not limited to system 100. Conveniently, all C(m) for m=0 to M-1 of control vector C(m) are initially set to logical "0" so that {C(m)} is a default control vector and control network 150 is at a default state.

One cycle with steps 210, 220, 230 and 240 of method 200 is described as follows: In reading step 210, system 100 receives a first data vector (e.g., {X(i-1,j)}) ("DATA IN" line 211) with data units of data set 10 and stores the first data vector in e.g., buffer 110. In determining step 220, system 100 determines which calculation functions are to be performed in the cycle. Preferably, relator 120 relates thereby some or all new data units of the of first data vector to data vectors received in previous cycles and provides a control vector (e.g., {C(m)}). As illustrated by lines 221 and 222 at the end of determining step 220, two or more of the following alternative calculating steps 231 or 232 can be performed. In calculating step 230, calculator 130 receives the control vector and performs some or all of calculation functions h(0), h(1), h(n) to h(N-1) in step 231 (e.g., function set {h(n)}') or in step 232 (e.g., function set {h(n)}"). The selection between the alternatives is implemented, for example by control network 150. The second vector is formed from results of calculation functions h(n) during the present cycle or from results h(n) of previous cycles. (The term "or" includes "and"). "DATA OUT" line 235 symbolizes that vector {Y(k,l)} is available at e.g., output 102. In storing intermediate results step 240, these intermediate results h'(n) or {Y(k,l)} of the present cycle are stored in e.g., storage 140.

When the cycle is repeated (line 250), with e.g., {X(i,j)}) at new time point i, then the same intermediate results can be used again, depending on the new control vector {C(m)}. Thereby, some or all processing steps do not need to be performed again.

In other words, method 200 for transforming a first matrix (e.g., data set 10) into a second matrix (e.g., data set 20) has the steps of: (1) reading a first vector (e.g., {X(i-1,j)}) of the first matrix (in e.g., reading step 210); (2) transforming (in e.g., calculating step 230) the first vector into a first output vector (e.g., {Y(k,l)}) of the second matrix and storing (in e.g., storing step 240) intermediate calculation results (e.g., h'(n)); (3) reading a second vector (e.g., {X(i,j)}) of the first matrix (in e.g., reading step 210); (4) comparing the second vector to the first vector and determining at which vector elements (e.g., X(i-1,j) and X(i,j)) in both vectors are similar (in e.g., determining step 220); (5) transforming the second vector using the intermediate results obtained in step (2) for similar vector elements determined in step (4) (in e.g., calculating step 230), (6) repeating steps (2) to (5) with further sample vectors.

Or, method 200 for transforming data set 10 with an ordered array of data elements X(i,j) which can change at every time transition i to (i+1) into data set 20 with an ordered array of elements Y(k,l) has the steps of: comparing consecutively input data from time i and input data from time (i+1); and calculating the Y-elements from X-elements by partially (some h'(n)) or completely (all h'(n)) reusing intermediate calculation results h'(n) when successive data elements for time transitions are substantially (cf. equation 10) the same.

FIG. 4 illustrates a simplified block diagram of an example for relator unit 120-m used in system 100 of FIG. 2. FIG. 4 is intended to be a non-limiting example which can be used for any relator unit 120-m. Reference numbers 120-m, 121-m, 122-m, and 123-m of FIG. 2 are given here primed and without the "m" as 120', 121', 122', and '123'. X(i-1,j) at input 121' and X(i,j) at input 122' are each represented by S old bits $b_{S-1}b_S \ldots b_1 b_0$ and new bits $b'_{S-1}b'_S \ldots b'_1 b'_0$, respectively, (see equation 7). Relator unit 120' determines control word C(m) according to the above given example (A) with S=3 and subsets {R} defined in equation (11). Relator unit 120' checks whether the (V=2)<S most significant bits (MSB) in X(i-1,j) and X(i,j) are equal or not. The MSB are identified as $b_{S-1} b_{S-2} \ldots b_{S-V+1}$, such as, for example, $b_{S-1}=b_2$ and $b_{S-V+1}=b_1$. Relator unit 120' comprises V=2 xor-gates 191 and 192 and and-gate 180. Inputs 181 and 182 of and-gate 180 are inverting inputs illustrated by circles. Xor-gate 192 has input 194 receiving old MSB-bits $b_2=b_{S-1}$ from inputs 121'; and xor-gate 192 has input 194' receiving new MSB-bits $b'_2=b'_{S-1}$ from input 122'. Xor-gate 191 has input 193 receiving old MSB-bits $b_1$ from input 121'; and xor-gate 191 has input 193' receiving new MSB-bits $b'_1$ from input 122'. LSB-bits $b_0$ and $b'_0$ are not considered. Lines from inputs 121' with $b_0$ and 122' with $b'_0$ are not required and therefore shown dashed. Output 196 of xor-gate 192 and output 195 of xor-gate 191 are coupled to inverting inputs 181 and 182 of and-gate 180, respectively. C(m) is available at output 123' of and-gate 180. C(m) is related to the bits by:

$$C(m) = \underline{(b_2 \text{ xor } b'_2)} \text{ and } \underline{(b_1 \text{ xor } b'_1)}, \quad (18)$$

wherein xor and and stand for logical operations and the underscoring stands for logical inversion. Xor-gates 191 and 192 and and-gate 180 are examples for logic circuits which can be modified without departing from the scope of the present invention.

The description of a preferred embodiment of the invention in FIGS. 1–4 is convenient for explanation. A person of skill in the art, is able, based on the foregoing description, to practice the present invention on a general purpose processor. Such a processor executes program instructions which follow method 200. For example, buffer 110 and storage 140 can be implemented by variables, relator 120 can be a comparison instruction, calculator 130 can be calculation instruction, and control network can be implemented by program flow instructions (e.g., jump instructions). Control vector {C(m)} determines a program flow in which the number of program instructions which are actually executed to calculate {Y(k,l)}k is minimized. Method 200 is illustrated in FIG. 3 is therefore also considered as a guideline to write program instructions.

As described above, statistical similarities of data units in the vertical direction (index i) have been considered. It is also possible to compare data units in the horizontal direction (index j) or to investigate data clusters.

While the present invention has been described in terms of particular structures, steps, devices and materials, those of skill in the art will understand based on the description herein that it is not limited merely to such examples and that the full scope of the invention is properly determined by the claims that follow.

We claim:

1. An apparatus that periodically receives input data units:

$$X(i,j) \in \{X(i,0) X(i,1) X(i,j) \ldots X(i,J-1)\}$$

at time points (i-1) and i and periodically provides output data units:

$$Y(k,l) \in \{Y(k,0) Y(k,1) Y(k,l) \ldots Y(k,L-1)\},$$

at time points (k−1) and k according to a transfer function H having calculation functions h(n), said apparatus comprising:

a buffer for receiving {X(i−1,0) X(i−1,1) X(i−1,j) . . . X(i−1,J−1)};

a relator for receiving {X(i,0) X(i,1) X(i,j) . . . X(i,J−1)}, said relator being coupled to said buffer and providing a control vector {C(0) C(1) C(m) . . . C(M−1)} with each C(m) having a first logical value when X(i−1,j) and X(i,j) belong to predetermined sets {R} or having a second, opposite logical value; and a processor coupled to said relator, said processor receiving {X(i,0)X(i,1)X(i,j) . . . X(i,J−1)} and calculating {Y(k,0)Y(k,1)Y(k,l) . . . Y(k,L−1)} by said calculation functions h(n), said processor using precalculated intermediate result h'(n) when C(m)=the first logical value instead of calculating h(n) again, whereby calculation time is saved.

2. The apparatus of claim 1 further having a connection between said relator and said buffer so that {X(i,0) X(i,1) X(i,j) . . . X(i,J−1)} goes into said buffer becoming {X(i−1,0) X(i−1,1) X(i−1,j) . . . X(i−1,J−1)}.

3. The apparatus of claim 1 wherein said processor comprises a storage for storing intermediate results h'(n).

4. The apparatus of claim 1 wherein said processor stores calculation instructions for transforming X(i,j)∈{X(i,0) X(i,1) X(i,j) . . . X(i,J−1)} into Y(k,l)∈{Y(k,0) Y(k,1) Y(k,l) . . . Y(k,L−1)}, said processor using said control vector {C(0) C(1) C(m) . . . C(M−1)} for determining a flow of said instructions in which the number of performed instructions is minimized.

5. The apparatus of claim 1 wherein C(m) becomes the first logical value for $|X(i-1,j)-X(i,j)| \leq RD$, with RD being a reference difference.

6. The apparatus of claim 1 wherein C(m) becomes the first logical value for X(i−1, j)=X(i,j) and becomes the second logical value for X(i−1, j)≠X(i,j).

7. The apparatus of claim 1 wherein said predetermined sets {R} are provided to said relator by a control input.

8. The apparatus of claim 1 wherein said predetermined sets {R} determine a logical comparison.

9. The apparatus of claim 1 wherein said predetermined sets {R} determine an arithmetical comparison.

10. The apparatus of claim 1 wherein said X(i,j) are image samples, wherein said transfer function H defines a Discrete Cosine Transform (DCT), and wherein said Y(k,l) are frequency coefficients.

11. The apparatus of claim 1 wherein J=L.

12. The apparatus of claim 1 wherein said X(i−1,j) are image samples taken in one dimension from one picture line and wherein said X(i,j) are image samples taken in the same dimension from a neighboring picture line.

13. The apparatus of claim 1 wherein said X(i−1,j) are represented by S bits $b_{S-1}b_sb_0$ and wherein said X(i,j) are represented by S bits $b'_{S-1}b'_sb'_0$ and wherein said relator comprises logic circuits receiving at least one b bit and at least one b' bit to generate said C(m).

14. A method for transforming a first matrix into a second matrix in computer memory, said method comprising the steps of:

(1) reading a first vector of said first matrix;

(2) transforming said first vector into a first output vector of said second matrix and storing intermediate calculation results;

(3) reading a second vector of said first matrix;

(4) comparing said second vector to said first vector and determining at which vector elements in both vectors are similar;

(5) transforming said second vector using said intermediate results obtained in said step (2) for similar vector elements determined in said step (4); and (6) repeating steps (2) to (5) with further sample vectors.

15. The method of claim 14 wherein said first matrix comprises image elements and wherein transforming is performed according to two-dimensional discrete cosine transformation (DCT) and wherein said transforming steps (2) and (5) use one-dimensional DCT.

16. The method of claim 14 wherein in said step (4), that vector elements are determined as similar which belong to predetermined sub-sets {R} of a magnitude set {Z} of said elements of said vectors.

17. A method for transforming a first data set with an ordered array of first data elements into a second data set with an ordered array of second elements in a computer accessible memory, said method comprising the steps of:

comparing consecutively input data from time i and input data from time (i+1); and calculating said second elements from said first elements by partially or completely reusing intermediate calculation results when successive data elements for time transitions are substantially the same.

18. The method of claim 17 wherein said first data set from time i is compared to said first data set from time (i+1) by comparing substantially every components of said data set.

19. The method of claim 17 wherein intermediate calculation results are reused when said input data from time i and input data from time (i+1) are within predetermined value regions.

20. The method of claim 17 wherein the first data set with an ordered array of first data elements changes from time transition i to time transition (i+1) into a second data set with an ordered array of second elements.

* * * * *